A. BERG.
PROCESS OF RECOVERING WASTE ALCOHOL FROM LIQUOR CASKS OR BARRELS.
APPLICATION FILED NOV. 23, 1908.

911,367.

Patented Feb. 2, 1909.

attest
H. G. Fletcher
M. C. Smith

Inventor.
Alexander Berg,
By Higdon Longan
Attys.

UNITED STATES PATENT OFFICE.

ALEXANDER BERG, OF ST. LOUIS, MISSOURI.

PROCESS OF RECOVERING WASTE ALCOHOL FROM LIQUOR CASKS OR BARRELS.

No. 911,367.     Specification of Letters Patent.     Patented Feb. 2, 1909.

Application filed November 23, 1908. Serial No. 464,100.

*To all whom it may concern:*

Be it known that I, ALEXANDER BERG, a citizen of the United States, and resident of St. Louis, Missouri, have invented certain new and useful Improvements in a Process of Recovering Waste Alcohol from Liquor Casks or Barrels, of which the following is a specification containing a full, clear, and exact description, reference being had to the accompanying drawings, forming a part hereof.

My invention relates to a process of recovering waste alcohol from liquor casks or barrels, my object being to extract and recover by a simple and expeditious process the alcohol which remains in the pores and the cells of the inner surfaces of casks and barrels which have been emptied of their contents, and which process involves the generation of steam within the cask or barrel, and the application of a cooling medium to the exterior surface of the cask or barrel to prevent the warping of the cask or barrel during the carrying out of the process.

Figure 1:
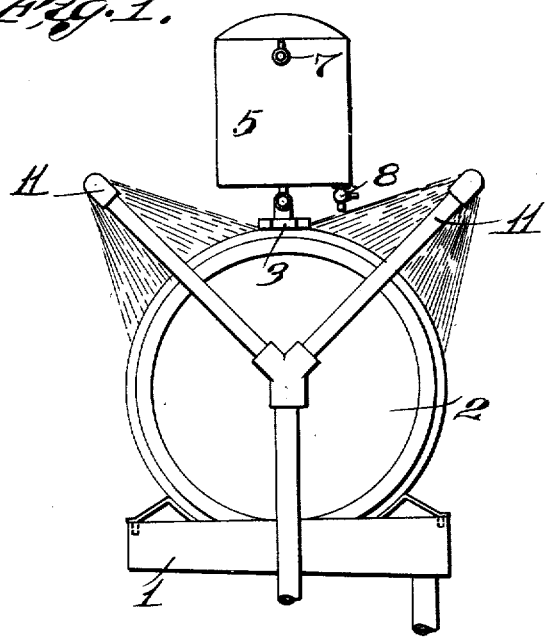
Figure 2:
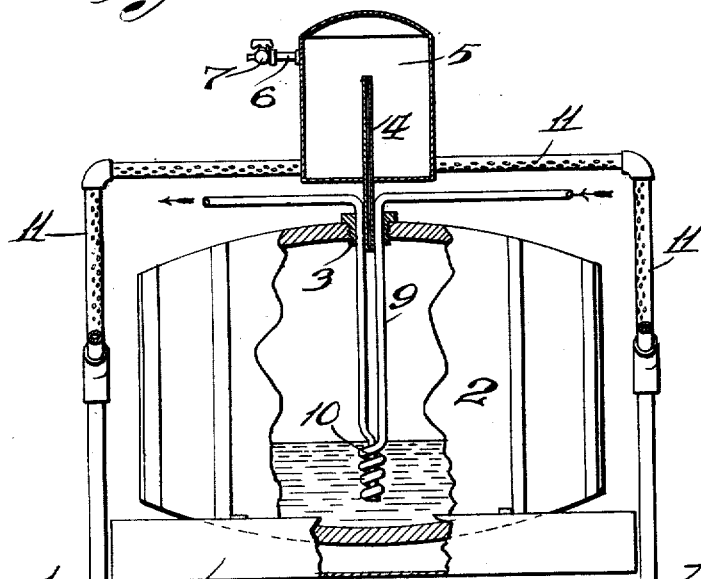

In order that my improved process may be more readily understood, reference may be had to the accompanying drawings, in which:

Figure 1 is an end elevation of a cask or barrel located in an apparatus utilized in connection with my improved process; Fig. 2 is a side elevation of the barrel and apparatus with parts in vertical section.

Referring by numerals to the accompanying drawings: 1 designates a pan or receptacle, above which is supported the cask or barrel 2, from which the alcohol is to be recovered, and located in the bung hole of the cask or barrel is a screw-threaded bung or plug 3, in the center of which is seated a small open-ended tube 4, which leads upward and discharges into the upper portion of a tank 5, provided in its upper end with an outlet 6, controlled by a valve 7, and also provided in its lower end with an outlet valve 8.

Leading to and through the plug 3, from a suitable source of steam supply, is a pipe 9, which extends downward through the plug, and formed in said pipe is a coil 10, which, when the plug is properly seated in the bung hole of a cask or barrel, occupies a position in the lower portion of the cask or barrel, and from this coil 10 the pipe extends upward and out through the plug or bung 3.

Arranged above and adjacent the ends of the cask or barrel are pipes 11, which are perforated in such a manner as that when water is delivered to and through said pipes it will discharge from the perforations onto the upper portion and ends of the cask or barrel, and will finally discharge into the tank or receptacle 1.

In carrying out my improved process, a small amount of water is located in the cask or barrel, after which the screw plug or bung 3, carrying the pipe 9, is inserted in the bung hole of the cask or barrel, with the coil 10 submerged in the water within said cask or barrel. Steam is now turned on through the pipe 9, and as the coil 10 is submerged beneath the water within the cask or barrel, the steam in passing through said coil will heat and vaporize the water within the cask or barrel, and the resulting vapor will fill said cask or barrel, thus coming in contact with the entire inner surface thereof, and said steam will volatilize the alcohol contained in the pores and cells in the wood of which the cask or barrel is formed, and the steam carrying this volatilized alcohol will finally discharge through the tube 4 into the tank 5. This tank performs the function of a condensing chamber, inasmuch as the steam and volatilized alcohol are condensed in said tank, from whence they may be withdrawn as desired and further treated to separate the alcohol from the water of condensation.

The steam generated within the cask or barrel necessarily heats the same to a high degree and as a result there is a tendency of the wood forming the cask or barrel to warp or twist, thus rendering said cask or barrel unfit for further use, and to overcome this tendency to warp, I apply a cooling medium in the form of water thrown onto the exterior surface of the cask or barrel by means of the perforated pipes 11, which action thoroughly cools the entire exterior surface of the cask or barrel, and thus counteracts any tendency of the wood in said cask or barrel to warp.

My improved process can be very cheaply and expeditiously carried out, and the alcohol contained in the inner surface of a cask or barrel is readily and cheaply recovered without injury to the cask or barrel, or without rendering the same unfit for further use.

I claim—

1. The herein described process of recovering waste alcohol from liquor casks and barrels, consisting in locating a quantity of water within the cask or barrel, heating said water to such a degree as to generate steam, conducting the steam and volatilized fluid carried thereby to a condensing tank, and simultaneously discharging a cooling medium onto the exterior surface of the cask or barrel.

2. The herein described process of recovering waste alcohol from liquor casks and barrels, consisting in generating a sufficient quantity of steam within the cask or barrel to permeate the entire inner surface of said cask or barrel, and simultaneously applying a cooling medium to the exterior surface of the cask or barrel.

In testimony whereof, I have signed my name to this specification, in presence of two subscribing witnesses.

ALEXANDER BERG.

Witnesses:
 M. P. SMITH,
 E. L. WALLACE.